United States Patent [19]

Meguerditchian

[11] Patent Number: 5,156,412
[45] Date of Patent: Oct. 20, 1992

[54] RECTILINEAR PEDAL MOVEMENT DRIVE SYSTEM

[76] Inventor: Ohannes Meguerditchian, 8785 Southwestern, No. 2177, Dallas, Tex. 75206

[21] Appl. No.: 652,786

[22] Filed: Feb. 8, 1991

[51] Int. Cl.[5] .............................................. B62M 1/04
[52] U.S. Cl. .................................. 280/241; 280/252; 482/57
[58] Field of Search ............... 280/252, 253, 255, 256, 280/257, 258, 241; 272/73

[56] References Cited

U.S. PATENT DOCUMENTS

| 556,802 | 3/1896 | Boyle | 280/241 |
|---|---|---|---|
| 566,838 | 9/1896 | Boyle | 280/241 |
| 3,891,235 | 6/1975 | Shelly | 280/252 |
| 4,169,609 | 10/1979 | Zampedro | 280/252 |
| 5,044,627 | 9/1991 | Huang | 272/73 |

FOREIGN PATENT DOCUMENTS

| 2142137 | 3/1973 | Fed. Rep. of Germany | 280/252 |
|---|---|---|---|
| 802435 | 6/1936 | France | 280/252 |
| 667140 | 9/1988 | Switzerland | 280/253 |
| 875366 | 8/1961 | United Kingdom | 280/252 |

*Primary Examiner*—Mitchell J. Hill

[57] ABSTRACT

A drive system for the application of rectilinear drive force, wherein the rectilinear force is converted to a rotational force. The apparatus employs power blocks which are slidably mounted upon opposing parallel rectilinear motion guides. The power blocks are connected together and are disposed at opposite ends of the apparatus. Connected to each of the power blocks is a power transference chain which rotates an idler sprocket and a power sprocket when force is applied to the power blocks. The idler sprocket rotates in both clockwise and counter-clockwise directions, while the power sprocket coupled thereto applies force in solely a clockwise direction and is disengaged from its mounting axle by a unidirectional clutch when rotated in a counter-clockwise direction. The power sprocket applies a force to the drive resistance point, which in the case of a bicycle comprises the rear wheel thereof.

29 Claims, 1 Drawing Sheet

RECTILINEAR PEDAL MOVEMENT DRIVE SYSTEM

BACKGROUND OF THE INVENTION

1. Field of the Invention

The present invention relates to a drive system, and more particularly, to a propulsion system for a bicycle, or the like, having a vertically oriented, rectilinear motion path, wherein the rectilinear motion is converted to a rotary motion.

2. Description of Related Art

Humankind has long aspired to achieve a more physically fit body. Devices of all sizes, shapes and configurations have been created with this purpose in mind; exercises designed to develop specific muscles in particular ways have been designed by scientists, doctors, engineers and the weekend athlete. Some of these machines and techniques improve strength, some improve conditioning and others improve muscular tone.

Regardless of this multitude of mechanisms and techniques, many deficiencies yet exist with many physical conditioning devices. Such deficiencies include non-efficient application of muscle strength from the human body to the object of the exercise as well as lost power transference. Bicycles illustrate a class of widely used exercise machines which have been the subject of various refinements. Athletes often employ bicycles for exercise as well as competition. Bicycles are also used in many countries as a mode of transportation, in addition to a means of exercise. While bicycle manufacturers have sought to produce lighter bicycles, more flexible bicycles and more durable bicycles through the use of a variety of materials, the conventional bicycle continues to employ a less than completely efficient drive train. Although this area has received considerable attention in recent years a more efficient exercise and transportation apparatus yet remains to be developed.

Conventional bicycles incorporate an axle located approximately midway between the front and rear tires. Perpendicularly affixed to the axle are shafts, at the end of which are pedals that project outwardly from the bicycle. The pedals allow the user to utilize the propulsive power generated by the human body. The axle usually has a sprocket that engages a chain driving the rear tire, and which propels the bicycle forward. Thus, the axle, shaft, pedal configuration of the bicycle drive mechanism to force the rider to drive his or her feet and legs in a generally circular motion. This motion while effective in creating sufficient force to propel the bicycle forward, does not do so with maximum efficiency.

The rotational motion forced upon a rider by the drive mechanism of a conventional bicycle results in lost motion and wasted energy. The bicycle's drive is developed from the downward push of the rider's legs and feet along the circular path of the pedals, and the circular path makes it difficult for the rider to exert a constant propulsive force. This inherent lost motion problem decreases the rider's ability to pace himself or herself during a long journey. Thus, a drive system which eliminates lost motion and increases the length of the power stroke would be a marked advance over the prior art. The present invention accomplishes this goal, while increasing power uniformity and decreasing the length of the rider's reset stroke. In addition, the improved drive system results in a more efficient means for the application of propulsive power and for increasing the endurance of the rider.

SUMMARY OF THE INVENTION

The present invention relates to a drive system for converting rectilinear motion to rotary motion. In one aspect, the invention includes an improved bicycle drive system of the type wherein bicycle pedals are driven by the feet of a rider in opposite directions for rotating a drive sprocket which is coupled to, and drives, a wheel sprocket thereby propelling the bicycle in a forward direction. The improvement comprises a means for mounting the pedals to create oppositely disposed rectilinear motion. A means for producing a first bi-directional rotary motion in response to rectilinear actuation of each of the pedals is provided and is linked to the pedals. Also provided is a means for transducing the primary bi-directional rotary motion into a secondary uni-directional motion. The secondary uni-directional motion is coupled to the drive sprocket by a coupling means and results in the propulsion of the bicycle.

In another aspect, the invention includes a drive system comprising a pair of vertically oriented, parallel rectilinear motion guide. A pair of force blocks are separately and slidably mounted on the motion guides. Means are provided for reversibly oscillating the force blocks, wherein the force blocks are disposed at opposite ends of the parallel rectilinear motion guides. A drive force resistance means is coupled to the force blocks. Means are then provided for transferring the drive force from the force blocks to the resistance means when a rectilinear force is applied to the force blocks. A unidirectional clutch means links, and is disposed between, the transfer means and the force blocks for transferring the drive force in a single direction for the generation of rotary motion.

In another aspect, the invention includes the drive system described above wherein the transfer means comprises an idler axle mounted at one end of the parallel rectilinear motion guides and having two idler sprockets. One of the idler sprockets is linked to one of the force blocks, with the other of the idler sprockets being linked to the other of the force blocks. A drive axle is mounted at the other end of the parallel rectilinear motion guides, with the drive axle being aligned parallel to the idler axle. The drive axle comprises a shaft having a drive wheel mounted thereon for rotation therewith and a pair of driving sprockets also mounted thereon. The drive axle further is coupled to the unidirectional clutch means, wherein the unidirectional clutch means is mechanically interconnected to one of the pair of driving sprockets. The other of the unidirectional clutch means is mechanically interconnected to the other of the pair of driving sprockets. Furthermore, one of the pair of driving sprockets is linked to one of the force blocks, with the other of the pair of driving sprockets being linked to the other of the force blocks. Each of the force blocks is connected to one of a pair of drive chains which link the idler sprockets, the drive sprockets and the force blocks together. The drive chains are trained around one of the idler sprockets and drivingly trained around one of the driving sprockets. The driving sprockets function unidirectionally, thus providing a drive force in only one direction. The unidirectional clutch means causes the driving sprockets to actively engage the drive axle when turned in the proper direction.

In another aspect, the above described invention is constructed with the pair of parallel rectilinear motion guides mounted on a bicycle frame, with the drive wheel connected to the rear bicycle wheel thereby transferring a propulsion force thereto. An outer housing covers the mechanics of the apparatus. The outer housing defines a guide for the horizontal member protruding from the force block. The outer housing also includes an arcuate mounting guide which is adjustably fixed to the bicycle frame.

In an alternative embodiment, the bicycle may be a stationary bicycle, for example of the type used for exercise, rather than a conventional bicycle. As used herein, the term "bicycle" refers to both stationary and conventional bicycles.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF THE PREFERRED EMBODIMENT

Figure 1:
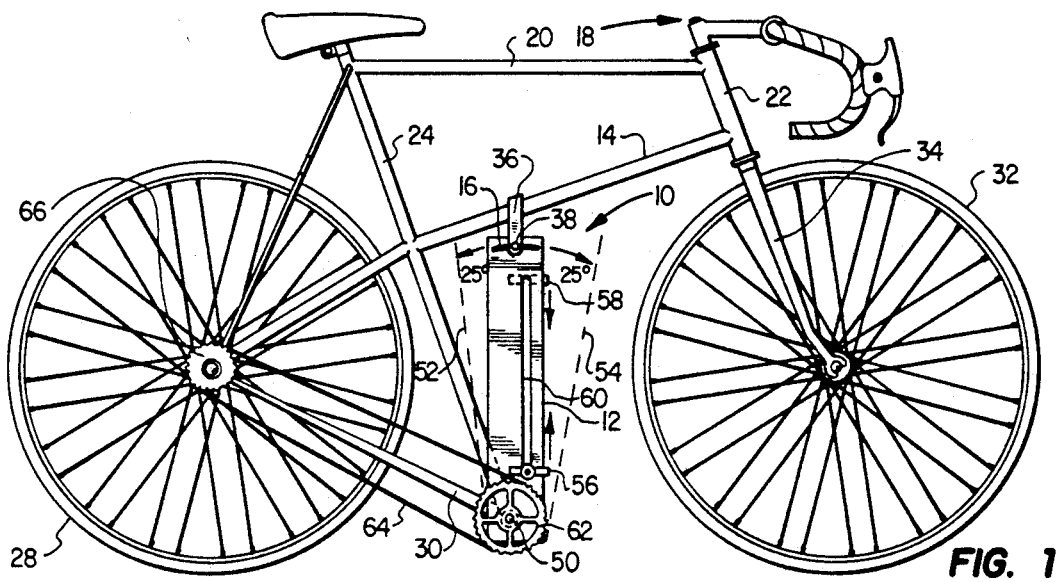
FIG. 1 is a side elevational view of a bicycle having incorporated thereon a drive system constructed in accordance with the principles of the present invention.

Referring first to FIG. 1, there is shown a side elevational view of a bicycle 18 having a vertically oriented, rectilinear travelling drive system 10 constructed in accordance with the principles of the present invention. The bicycle 18 is assembled with an upper frame member 20 extending from a front frame member 22 to a rear frame member 24. Below the upper frame member 20 is an apparatus support bracket or frame member 14, which also extends from the front frame member 20 to the rear frame member 24. The lowermost end of the rear frame member 24 intersects with the lower end of the drive system 10. The rear wheel 28 is mounted between the rear fork 30. The rear fork 30 extends from the point of engagement between the rear frame member 24 and the rectilinear travelling drive system 10. The front wheel 32 is mounted between a front fork 34. The front fork 34 extends from the bottom of the front frame member 22.

The drive system 10 includes an outer housing 12 in which the mechanics of the drive system 10 reside. The outer housing 12 of the drive system 10 is affixed at its uppermost portion to a mounting bracket 36. The mounting bracket is affixed to the apparatus support bracket or frame member 14. The outer housing 12 is mounted to the mounting bracket 36 by means of an arcuate slotted guide 16. The mounting bracket 36 projects from the underside of the apparatus support bracket VC3 or frame member 14 and receives an adjustably secured pin 38, which passes into the arcuate slotted guide 16. Once in place, the adjustably secured pin 38 is tightened to provide frictional engagement between the arcuate slotted guide 16 of the drive system 10 and the mounting bracket 36.

The lowermost end of the drive system 10 is secured to bicycle 18 at the lowermost portion of the rear frame member 24. Drive axle 50 projects into the outer housing 12 and through the bicycle frame. Thus, drive axle 50 holds the lower end of the drive system 10 in place. The drive axle 50 rotates within the bicycle frame and permits the outer housing 12 to pivot about the drive axle 50. By employing the adjustably secured pin 38 in coordination with the arcuate slotted guide 16, the mounting bracket 36 and the pivoting attachment of the drive axle 50, the outer housing 12 of the drive system 10 may be angularly shifted. As a result, the outer housing may sit completely vertical within the bicycle 18, or the rider may shift the outer housing 25 degrees forward or 25 degrees to the rear. The angular shift is illustrated by notional lines 52 and 54.

Still referring to FIG. 1, there is shown two foot pedals 56 and 58. The foot pedals 56 and 58 travel within the pedal guide 60 located on either side of the outer housing 12. As foot pedal 56 is pushed downward by the rider, foot pedal 58 will automatically rise within the pedal guide 60. The up and down motion of the foot pedals 56 and 58 causes the internal mechanics of the drive system 10 to turn the drive axle 50. Drive sprocket 62 is fixedly attached to the drive axle 50, such that the rotation of the drive axle 50 causes the drive sprocket to rotate as well. Drive chain 64 engages the drive sprocket 62 and transfers the drive energy from the drive system 10 to the rear wheel 28 by means of the rear drive gears 66.

Figure 2:
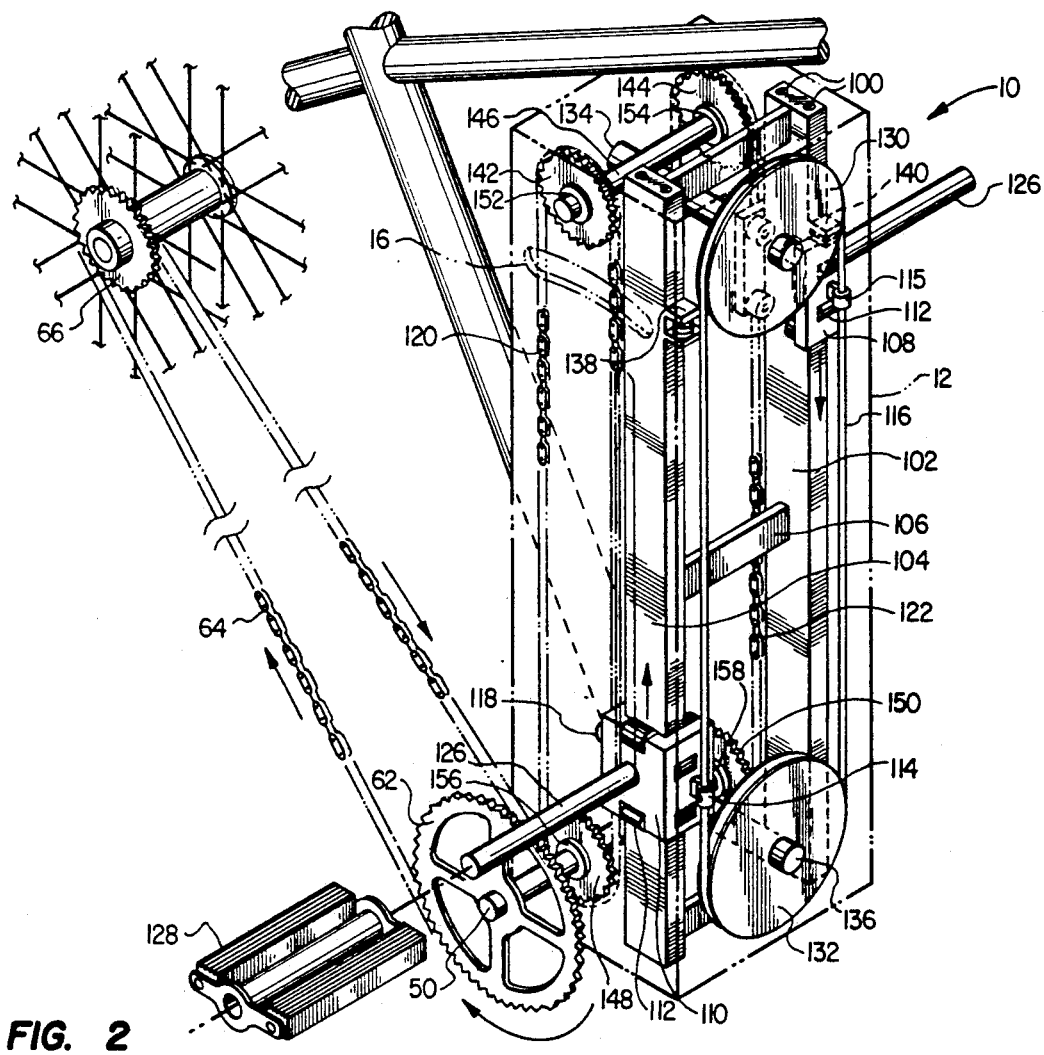
FIG. 2 is an enlarged, fragmentary, perspective view of the drive system of FIG. 1 illustrating the mechanical linkage for converting rectilinear motion to rotational motion.

Referring now to FIG. 2, there is shown a perspective view of the rectilinear travelling drive system 10 mounted within the frame of the bicycle 18. The outer housing 12 is shown in phantom such that the internal mechanics of the drive system 10 can be viewed. Mounting screws 100 secure the outer housing to the two parallel rectilinear motion guides 102, 104. The two parallel rectilinear motion guides 102 and 104 comprises the frame for the drive system 10. Cross-frame members 106 fixedly connect the parallel rectilinear motion guides 102 and 104, thereby creating the necessary structural strength.

The force block 108 is slidably mounted upon the rectilinear motion guide 102, while the force block 110 is slidably mounted upon the rectilinear motion guide 104. The force blocks 108 and 110 include a number of force block rollers 112. The force block rollers 112 are located about the force blocks 108 and 110. The force block rollers 112 slide along the rectilinear motion guides 102 and 104, thus enabling the force blocks to move along the rectilinear motion guides 102 and 104. Further included on the force blocks 108 and 110 are cable clamps 114 and 115. The cable clamp 114 secures flexible cable 116 to the force blocks 108 and 110. Located on the opposite side of the force blocks 108 and 110 from each of the cable clamps 114 and 115 are chain clamps 118 and 119 which secure the power transference chains 120 and 122 to the force blocks 108 and 110. Further included upon the force blocks 108 and 110 are horizontal force receiving bars 124 and 126. The force receiving bars 124 and 126 project orthogonally from the force blocks 108 and 110 and are provided so that the user can apply the drive force intended. In the preferred embodiment, foot pedals 128 are mounted on the force receiving bars 124 and 126.

Still referring to FIG. 2, there is illustrated upper direction reversing wheel 130 and lower direction reversing wheel 132. The flexible cable 116 is trained about the upper direction reversing wheel 130 and the lower direction reversing wheel 132, forming a closed loop. The upper direction reversing wheel rotates about upper reversing wheel axle 134, while the lower direction reversing wheel 132 rotates about lower reversing wheel axle 136. The flexible cable 116 passes through each of the cable clamps 114 and 115, thereby affixing the force blocks 108 and 110 to the flexible cable 116. The flexible cable connects the force blocks 108 and 110 in order to maintain their oppositely disposed positions along the parallel rectilinear motion guides 102 and 104. Thus, when a downward force is applied to the force block 108, it causes the flexible cable 116 to move as well. The movement of the flexible cable 116 pulls the force block 110 upward along the rectilinear motion guide 104. Consequently, a force on one of the force blocks 108 or 110 causes the other force block to automatically move in the opposite direction along the rectilinear motion guide upon which it is mounted. As a result of this automatic oscillation, the two force blocks 108 and 110 maintain their oppositely disposed positions. The upward movement of the force block 110 is terminated by force block stop 138 which is mounted upon rectilinear motion guide 104. Force block stop 140 terminates the upward movement of force block 108.

As the force blocks 108 and 110 oscillate up and down along their respective rectilinear motion guide 102 or 104, the power transference chains 120 and 122 are driven along their loop. The power transference chain 120 begins its loop at the chain clamp 118 affixed to the force block 110. The power transference chain 120 then engages the teeth of idler sprocket 142 and proceeds to the teeth of power sprocket 148. The idler sprocket 142 is mounted on the idler axle 146, which is affixed to the inner wall of the outer housing 12 and runs perpendicular to the parallel rectilinear motion guides 102 and 104. The idler sprocket 142 is mounted on one end of the idler axle 146 and a second idler sprocket 144 is mounted on the opposite end of the idler axler 146. The idler sprockets 142 and 144 are mounted on idler bearings 152 and 154 which are directly mounted on the idler axle 146. The idler bearings 152 and 154 permit the idler sprockets 142 and 144 to rotate in either a clockwise or counter-clockwise direction.

The power transference chains 120 and 122 engage the power sprockets 148 and 150 at the lower end of the drive system 10. The power sprockets 148 and 150 are mounted on unidirectional clutches 156 and 158, which, in turn, are mounted upon the drive axle 50. The unidirectional clutches 156 and 158 enable the drive axle 50 to turn when the power sprockets 148 and 150 are rotated in the proper direction (clockwise) by the power transference chains 120 and 122. Thus, when the power transference chain 120 is rotated clockwise, e.g., the power block 110 is pushed down, the unidirectional clutch 156 is not engaged and allows the power sprocket 148 to turn the drive axle 50. At the same time, the power block 108 is pushed up, which causes power sprocket 150 to rotate counter-clockwise, thereby engaging the unidirectional clutch 158 which prevents the power sprocket 150 from attempting to rotate the drive axle 50. Consequently, there is always a rotational force being applied to the drive axle 50 by either one of the power sprockets 148 or 150. In this way the drive sprocket 62 is turned and causes drive chain 62 to rotate rear drive gears 66.

Thus, there has been described and illustrated herein a drive device. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A bicycle drive apparatus for converting a rectilinear driving force imparted to the bicycle pedals to a rotary force delivered to a bicycle wheel, said rectilinear driving force being generated by the feet of a rider positioned on the pedals of the bicycle, said apparatus comprising:
   first and second vertically mounted, parallel rectilinear motion guides disposed between said pedals;
   first and second force blocks slidably mounted on said motion guides;
   a flexible cable;
   a means for reversing direction of said flexible cable trained about said means, said flexible cable connecting said first and second force blocks;
   and idler axle mounted adjacent one end of said motion guides, having first and second idler sprockets mounted on opposite ends of said idler axle, one of said idler sprockets linked to said first force block, the other of said idler sprockets linked to said second force block;
   a drive axle mounted adjacent the other end of said parallel rectilinear motion guides and extending thereacross, said drive axle being aligned parallel to said idler axle and having a drive wheel mounted on said drive axle for rotation therewith;
   first and second power sprockets mechanically interconnected with said drive axle inwardly of said drive wheel;
   means for unidirectionally clutching said power sprockets; and
   first and second power transference chains linking said first and second power sprockets to said first and second force blocks, respectively.

2. The apparatus as set forth in claim 1 further comprising at least two cross-frame members, said first and second parallel rectilinear motion guides being fixedly connected by said cross-frame members, and said cross-frame members being perpendicularly situated with respect to said motion guides.

3. The apparatus as set forth in claim 1 further comprising a series of rollers, fixed within each of said first and second force blocks to provide slidable mounting thereof, said first and second force blocks being U-shaped and respectively fitted about said first and second motion guides.

4. The apparatus as set forth in claim 3 further comprising force receiving bars protruding from each of said first and second force blocks, said force receiving bars providing the user with means for applying force to said first and second force blocks.

5. The apparatus as set forth in claim 3 further comprising means for gripping said flexible cable to engage said flexible cable and a means for engaging said first and second power transference claims chains with said first and second force blocks, respectively.

6. The apparatus as set forth in claim 1 wherein said flexible cable trained around said means for reversing direction causes said first and second force blocks to reversibly oscillate along said motion guides and be disposed at opposite ends of said motion guides.

7. The apparatus as set forth in claim 1 wherein said power sprockets function unidirectionally, providing drive force in only one rotating direction, said means for unidirectionally clutching causing said power sprockets to actively engage said drive axle when rotating in such one rotating direction.

8. The apparatus as set forth in claim 1 wherein said drive wheel is connected to a rear wheel of said bicycle for the transference of propulsive force.

9. The apparatus as set forth in claim 1 further comprising an outer housing, said outer housing having motion guides for guiding said first and second force blocks and an arcuate slatted guide adjustably mounting said outer housing to said bicycle.

10. A drive system, said drive system comprising:
first and second force blocks;
first and second motion guides, said first force block being slidably coupled to said first motion guide, and said second force block being slidably coupled to said second motion guide;
a flexible cable connecting said first force block with said second force block;
a pair of power transference chains respectively engaged with said first and second force blocks such that force applied to said first and second force blocks is selectively transferred to and moves said power transference chains;
means for propulsion rotating in response to movement of said power transference chains; and
means, disposed between said power transference chains and said means for propulsion, for rotational unidirectional clutching of said means for propulsion.

11. The apparatus as set forth in claim 10 wherein said first and second force blocks are further characterized as each having a force receiving bar projecting orthogonally from each of said first and second force blocks and a set of rollers embedded within each of said first and second force blocks.

12. The apparatus as set forth in claim 10 wherein said first and second motion guides are parallel and fixedly secured.

13. The apparatus as set forth in claim 10 further comprising first and second idler sprockets being rotatable in either a clockwise or counter-clockwise direction, said first power transference chain engaging said first idler sprocket and said second power transference chain engaging said second idler sprocket, said first and second idler sprockets being oppposingly mounted on said first and second motion guides, respectively, permitting said power transference chains to rotate around said first and second idler sprockets.

14. A rectilinear motion drive system adapted for actuation by the human body wherein the user applies a drive force in a straight line, said drive system comprising:
a pair of vertically oriented, parallel rectilinear motion guides;
first and second force blocks, said first and second force blocks being separately and slidably mounted on said pair of motion guides;
first and second drive force means, coupled to said first and second force blocks, respectively, for translating rectilinear force and motion to angular force and rotating motion;
means for reversibly oscillating said first and second force blocks along said motion guides, said means for reversibly oscillating being attached to said first and second force blocks independently of said first and second drive force means; and means, connected with said first and second drive force means, for unidirectionally clutching each of said first and second drive force means.

15. The apparatus as set forth in claim 4 wherein said means for reversibly oscillating said first and second force blocks is a flexible cable and at least one direction reversing wheel, said at least one direction reversing wheel positioned at one end of said motion guides and having said flexible cable trained about said at least one direction reversing wheel.

16. The apparatus as set forth in claim 14 wherein said means first and second drive force is connected to a wheel.

17. The apparatus as set forth in claim 16 wherein said wheel is connected to a bicycle.

18. The apparatus as set forth in claim 14 wherein said first and second drive force means include a drive sprocket and a pair of power sprockets interconnected with said means for unidirectionally clutching.

19. An improved bicycle drive system of the type wherein bicycle pedals are driven by the feet of a rider for rotating a drive sprocket which is coupled to a driven wheel sprocket for the rotation thereof and the propulsion of the bicycle in a forward direction, the improvement comprising:
means for mounting said pedals for oppositely disposed rectilinear motion;
means for producing bi-directional rotary motion in response to rectilinear actuation of each of said pedals, said bi-directional rotary motion means linked to each of said pedals;
means for transducing said bi-directional rotary motion into a uni-directional motion, said pedals each attached with said means for transducing independently of said means for producing bi-directional rotary motion; and
means for coupling said uni-directional motion to said drive sprocket for the propulsion of said bicycle.

20. The drive system as set forth in claim 19 wherein said bi-directional rotary motion means resides at one end of said drive system and includes first and second idler sprockets, said idler sprockets being mounted to spin in both clockwise and counter-clockwise directions, an idler axle with said idler sprockets mounted on opposite ends thereof, and first and second power transference chains trained about said idler sprockets and connected to said pedals.

21. The drive system as set forth in claim 19 wherein said means for transducing resides at the opposite end of said drive system from said means for producing a bi-directional rotary motion and includes first and second means for unidirectional clutching of said means for transducing, first and second power sprockets mechanically connected to said first and second means for unidirectional clutching, respectively, said power transference chains trained independently about said power sprockets, and said means for unidirectional clutching unidirectionally engaging said power sprockets, thereby generating singularly directed output motion.

22. The drive system as set forth in claim 19 wherein said means for coupling comprises a drive axle fixedly connected with said means for clutching such that said drive axle rotates in response to output motion generated by said means for transducing.

23. The drive system as set forth in claim 19 wherein said pedals are further characterized as being first and second force blocks, a force receiving bar projecting orthogonally from each of said first and second force blocks, a set of rollers embedded within each of said first and second force blocks; and means for securing said pair of power transference chains to said first and second force blocks.

24. The drive system as set forth in claim 23 further comprising first and second vertically oriented, parallel rectilinear motion guides, said pedals being slidably mounted upon said motion guides.

25. The drive system as set forth in claim 24 further comprising means for reversibly oscillating said pedals, wherein said pedals are disposed at opposite ends of said motion guides and said oscillation means is attached to said pedals and adjacent to said motion guides.

26. An improved bicycle drive system of the type wherein bicycle pedals operate in a rectilinear motion when driven by the feet of a rider causing rotation of at least one wheel, the improvement comprising:
   means for mounting said pedals for oppositely disposed rectilinear motion;
   means, linked to said pedals, for producing a unidirectional rotary motion in response to rectilinear actuation of each of said pedals; and
   means for coupling said means for producing unidirectional rotary motion with said wheel of said bicycle to cause said wheel to rotate.

27. A drive system, said drive system comprising:
   first and second force blocks;
   first and second motion guides, said first force block being slidably coupled to said firsst motion guide, and said second force block being slidably coupled to said second motion guide;
   a flexible cable connecting said first force block with said second force block;
   a pair of power transference chains respectively engaged with said first and second force blocks such that force applied to said first and second force blocks is selectively transferred to and moves said power transference chains;
   means for propulsion rotating in response to movement of said power transference chains;
   means, disposed between said power transference chains and said means for propulsion, for rotational unidirectional clutching of said means for propulsion;
   a drive axle;
   a drive sprocket fixedly mounted on said drive axle; and
   a pair of power sprockets, each of said power sprockets connected to said drive axle by said means for rotational unidirectional clutching such that said power sprockets unidirectionally rotate, said power sprockets further engaging said power transference chains in a manner which transmits movement of said power transference chains to cause rotation of said drive axle in accordance with operation of said means for rotational unidirectional clutching.

28. A rectilinear motion drive system adapted for actuation by the human body wherein the user applies a drive force in a straight line, said drive system comprising:
   a pair of vertically oriented, parallel rectilinear motion guides;
   first and second force blocks, said first and second force blocks being separately and slidably mounted on said pair of motion guides;
   means for reversibly oscillating said first and second force blocks along said motion guides, said means for reversibly oscillating being attached to said first and second force blocks;
   an idler axle mounted adjacent one end of said motion guides;
   first and second idler sprockets mounted on opposite ends of said idler axle;
   a drive axle opposingly mounted adjacent said motion guides from said idler axle, said drive axle extending between said parallel rectilinear motion guides and being aligned parallel to said idler axle;
   a drive sprocket mounted on said drive axle;
   first and second power sprockets mounted on said drive axle for rotation with said drive axle;
   a pair of power transference chains independently interlinking said first power sprocket, said first idler sprocket and said first force block and said second power sprocket, said second idler sprocket and said second force block; and
   a means for unidirectionally clutching said drive sprocket, linking, and disposed between, said drive axle and each of said first and second power sprockets.

29. An improved bicycle drive system of the type wherein bicycle pedals are driven by the feet of a rider in opposite directoins for rotating a drive sprocket which is coupled to a driven wheel sprocket for the rotation thereof and the propulsion of the bicycle in a forward direction, the improvement comprising:
   means for mounting said pedals for oppositely disposed rectilinear motion;
   means for producing a bi-directional rotary motion in response to rectilinear actuation of each of said pedals, said bi-directional rotary motion means linked to each of said pedals;
   means for transducing said bi-directional rotary motion into a secondary uni-directional motion, said pedals each attached with said means for transducing independently of said means for producing bi-directional rotary motion;
   means for coupling said uni-directional motion to said drive sprocket for the propulsion of said bicycle; and
   an arcuate, adjustably attachable mounting bracket wherein said mounting bracket affixes said drive system to said bicycle and permits the rider to angularly alter said oppositely disposed rectilinear motion of said pedals.

* * * * *